US010384308B2

(12) United States Patent
Wohlfeil et al.

(10) Patent No.: US 10,384,308 B2
(45) Date of Patent: Aug. 20, 2019

(54) COATED PANE HAVING AREAS IN WHICH THE COATING IS PARTIALLY REMOVED

(71) Applicant: Saint-Gobain Glass France, Courbevoie (FR)

(72) Inventors: Dirk Wohlfeil, Raeren (BE); Ilkay Arslan, Aachen (DE); Ingo Von Der Weiden, Aachen (DE); Michael Behmke, Duesseldorf (DE); Stefan Droste, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 14/421,991

(22) PCT Filed: Aug. 20, 2013

(86) PCT No.: PCT/EP2013/067294
§ 371 (c)(1),
(2) Date: Feb. 16, 2015

(87) PCT Pub. No.: WO2014/033007
PCT Pub. Date: Mar. 6, 2014

(65) Prior Publication Data
US 2015/0202719 A1    Jul. 23, 2015

(30) Foreign Application Priority Data

Aug. 28, 2012 (EP) .................... 12181939

(51) Int. Cl.
*B23K 26/08* (2014.01)
*B32B 17/10* (2006.01)
(Continued)

(52) U.S. Cl.
CPC .......... *B23K 26/08* (2013.01); *B23K 26/0006* (2013.01); *B23K 26/082* (2015.10);
(Continued)

(58) Field of Classification Search
CPC ............ H05B 3/00; B64D 15/20; G01W 1/14
(Continued)

(56) References Cited

U.S. PATENT DOCUMENTS 6,356,236 B1 *  3/2002  Maeuser ................. B32B 17/10
                                                     343/713
6,730,389 B2 *  5/2004  Voeltzel ............ B32B 17/10174
                                                     343/711

(Continued)

FOREIGN PATENT DOCUMENTS

CN       1561559 A       1/2005
CN       1946644 A       4/2007
(Continued)

OTHER PUBLICATIONS

Written Opinion for PCT application PCT/EP2013/067294 filed on Aug. 20, 2013: dated Oct. 22, 2013 (PCT/ISA/210). English translation with German original.
(Continued)

*Primary Examiner* — Tu B Hoang
*Assistant Examiner* — Thomas Ward
(74) *Attorney, Agent, or Firm* — Pillsbury Winthrop Shaw Pittman LLP (57) ABSTRACT

A coated pane having a communication window, having: a. a base pane, b. a coating containing metal, c. a first grid plane and a second grid plane within the coating containing metal, wherein the first grid plane and the second grid plane have areas in which the coating is removed, in form of grid lines arranged in the manner of a mesh, the grid lines in the first grid plane on at least one long side transition into an open comb structure having teeth and the grid lines in the second grid plane on at least one long side transition into a closed comb structure, wherein the first grid plane is connected by means of at least one tooth of the open comb
(Continued)

structure to the closed comb structure of the second grid plane.

8 Claims, 9 Drawing Sheets

(51) Int. Cl.
  *C03C 17/36*   (2006.01)
  *C03C 23/00*   (2006.01)
  *H01Q 15/00*   (2006.01)
  *H05B 3/84*   (2006.01)
  *B23K 26/00*   (2014.01)
  *B23K 26/082*   (2014.01)
  *B23K 26/40*   (2014.01)
  *B23K 26/361*   (2014.01)
  *B23K 26/359*   (2014.01)
  *B23K 101/34*   (2006.01)
  *B23K 103/16*   (2006.01)
  *B23K 103/00*   (2006.01)

(52) U.S. Cl.
  CPC .......... *B23K 26/359* (2015.10); *B23K 26/361* (2015.10); *B23K 26/40* (2013.01); *B32B 17/10192* (2013.01); *C03C 17/36* (2013.01); *C03C 23/0025* (2013.01); *H01Q 15/0006* (2013.01); *H05B 3/84* (2013.01); *B23K 2101/34* (2018.08); *B23K 2101/35* (2018.08); *B23K 2103/16* (2018.08); *B23K 2103/172* (2018.08); *B23K 2103/50* (2018.08); *C03C 2218/328* (2013.01); *Y10T 428/24917* (2015.01)

(58) Field of Classification Search
  USPC ........ 343/711, 712, 713; 219/200, 202, 203, 219/522
  See application file for complete search history.

(56) References Cited

U.S. PATENT DOCUMENTS

| | | |
|---|---|---|
| 2002/0192473 A1 | 12/2002 | Gentilhomme et al. |
| 2003/0080909 A1 | 5/2003 | Voeltzel |
| 2004/0051869 A1 | 3/2004 | Sandberg et al. |
| 2007/0045264 A1 | 3/2007 | Nekoda et al. |
| 2007/0082219 A1 | 4/2007 | Fleury et al. |
| 2008/0005898 A1* | 1/2008 | Nishida ................ H05K 3/0038 29/830 |
| 2011/0146172 A1 | 6/2011 | Mauvernay |
| 2012/0193341 A1 | 8/2012 | Reul et al. |

FOREIGN PATENT DOCUMENTS

| | | |
|---|---|---|
| CN | 102206046 A | 10/2011 |
| DE | 19817712 | 4/2000 |
| EP | 0678483 | 10/1995 |
| JP | H07242441 A | 9/1995 |
| JP | 2002506596 A | 2/2002 |
| JP | 2005506904 A | 3/2005 |
| JP | 2008016520 A | 1/2008 |
| JP | 2011102218 A | 5/2011 |
| JP | 2013513538 A | 4/2013 |
| WO | 99/54961 | 10/1999 |
| WO | 2004/051869 | 6/2004 |
| WO | 2012/066324 | 5/2012 |

OTHER PUBLICATIONS

International Search Report dated Oct. 22, 2013 for PCT application PCT/EP2013/067294 filed on Aug. 20, 2013.

* cited by examiner

Prior Art

A base pane (1) is provided with a metal-containing coating (2).

The metal-containing coating (2) is locally de-coated with a laser in the form of grid lines (4.1), and a first grid area (3.1) with at least one long side with an open comb structure (6) is obtained.

The metal-containing coating (2) is locally de-coated adjacent the first grid area (3.1) with a laser in the form of grid lines (4.2), and a second grid area (3.2) with at least one long side with a closed grid (8) is obtained, whereby the first grid tile (3.1) is connected via the open comb structure (6) to the closed comb structure (8) of the second grid tile (3.2).

Fig. 9

COATED PANE HAVING AREAS IN WHICH THE COATING IS PARTIALLY REMOVED

CROSS REFERENCE TO RELATED APPLICATIONS

The present application is the US national stage of International Patent Application PCT/EP2013/067294 filed internationally on Aug. 20, 2013 which, in turn, claims priority to European Patent Application No. 12181939.5 filed on Aug. 28, 2012.

The invention relates to a coated pane with windows in the form of partially de-coated areas for permeability of high-frequency electromagnetic radiation as well as a method for its production and its use.

Panes with metal or metal-containing layers are widespread both in the field of architectural glazings and in the field of motor vehicle glazings. These metal-based coatings influence the transmittance, reflectance, and absorption behavior of electromagnetic radiation. Electrically conductive coatings can be used for the heating of the pane.

Metal-containing coatings with, for example, silver can significantly reduce the transmittance of infrared heat radiation in the space of a motor vehicle or a building situated behind the pane. In particular, in the case of motor vehicles, this property can also be combined by an electrical connection with a heating function of the silver-containing coating. The specific sheet resistance of silver enables the heating of a pane with very thin silver-containing layers, while the coating remains adequately transparent to visible light. Consequently, due to the advantages mentioned, panes with silver-containing coatings are being found in more and more motor vehicles.

However, panes with metal-containing coatings also entail disadvantages; for example, radiofrequency radiation is absorbed by many metal-containing coatings. The operation of many sensors, navigation, telecommunication, or radio devices is significantly impaired thereby. To solve these problems, an at least partial-area de-coating of the metal-containing coating is necessary. In the example of the electromagnetic radiation in the radiofrequency range, such as FM, AM, UHF, VHF, DAB, mobile telephony in the bands GSM 900, GSM 1800, and UMTS, satellite-assisted navigation (GPS), or microwave radiation, a mesh-like or grid-like de-coating is necessary for this. The grid meshes must have a distance between the lines that is significantly smaller than the wavelength of the desired electromagnetic radiation in question. To that end, the metal-containing coatings are, for example, removed in the form of lines using a suitable laser. Since only small amounts of the metal-containing coating have to be removed, the infrared radiation absorbing effect is largely retained.

EP 0 678 483 B1 discloses a glass substrate with a plurality of thin layers. These layers include an adhesive layer based on titanium oxide, tin oxide, or tantalum oxide, a cover layer, and a functional layer from the group of stainless steels. The thickness of the functional layer is preferably 15 nm to 45 nm.

U.S. 2002/0192473 A1 discloses a transparent substrate with a multilayer coating that can act on solar radiation. The coating includes at least one functional metal layer made of niobium, tantalum, or zirconium and a cover layer made of aluminum nitride, aluminum oxynitride, or silicon nitride.

U.S. 2011/0146172 A1 discloses a transparent substrate with a thin multilayer coating. The multilayer coating includes at least two absorbing functional layers and two transparent layers made of a dielectric material. The functional layers preferably contain a metal from the group of made up of niobium, tantalum, and zirconium. In a preferred embodiment, the functional layers are at least partially nitrided.

U.S. 2007/0082219 A1 discloses a heatable glass substrate with a multilayer silver-containing coating. The coating enables both temperature control in the motor vehicle and a heating function of the pane. The coating and, with it, the pane are opaque to electromagnetic radiation.

DE 198 17 712 C1 discloses a glass pane with a coating and a radiation window. The window is implemented in a limited contiguous area of the panel, in which there is a ratio of coating-free area to the total area of at least 25% with areal distribution of coating-free and coated areas.

WO 2004/051869 A2 discloses a metal coated pane that has a window transparent to radiofrequency signals. The window includes various radiofrequency-signal-permeable structures, for example, vertical or horizontal beams or zigzag structures.

U.S. Pat. No. 6,730,389 B2 discloses a metal coated pane that has multiple windows transparent to radiofrequency radiation connected to each other.

WO 2012/066324 A1 discloses a method for producing a coated glazing with a window transparent to electromagnetic radiation in the radiofrequency range. The window is produced by two-dimensional curved patterning using a laser.

With most methods of laser patterning, the size of the possible processing window is limited. The laser can only process and pattern regions up to a maximum size in one operation. When the communication window is larger than the scanning window of the laser, multiple separate process steps are required. If the pattern produced is supplemented by another pattern in a second process step, deviations often occur in the overlapping region, such as double lines, that interfere, as inhomogeneities, in the visual aspect, with the overall impression of the patterned area. Even with the help of relatively large two-dimensional blotters, these inaccuracies in the region of the overlapping patterns cannot be resolved. In addition, frequently, the accuracy and the reproducibility of the patterns produced within the coating suffers with the increasing size of the process window, for example, a communication window.

The object of the present invention is to provide a metal-coated pane that consists of a plurality of superimposed communication windows and has only slight or no inhomogeneities in the visual aspect in the transition region.

The object of the present invention is accomplished in accordance with the independent claim 1. Preferred embodiments emerge from the subclaims.

A method according to the invention for producing a coated pane with a communication window as well as its use emerge from other independent claims.

The coated pane with a communication window according to the invention comprises at least a base pane and a metal-containing coating. The pane preferably contains flat glass, float glass, quartz glass, borosilicate glass, soda lime glass, and/or mixtures thereof. Alternatively, the pane can also include polymers such as polycarbonate or polymethyl methacrylate (Plexiglas). The metal-containing coating preferably contains niobium, tantalum, molybdenum, zirconium, silver gold, aluminum, nickel, chromium, copper, and/or mixtures or alloys thereof, particularly preferably silver. In addition to the actual coating, further dielectric layers are preferably also present. The dielectric layer preferably includes $SiO_2$, $SnO_2$, $Bi_2O_3$, $ZnO$, $TiO_2$, $Ta_2O_5$, $AlN$, $Si_3N_4$, and/or mixtures thereof. The order of the deposition of a dielectric layer and a functional layer on the composite pane is variable; preferably, a plurality of functional layers and dielectric layers are deposited on the composite pane. Optionally, further layers, for example, cover layers, can be present. The metal-containing coating preferably has a sheet resistance from 0.5 ohm/square to 200 ohm/square and particularly preferably from 0.7 ohm/square to 30 ohm/square. The metal-containing coating can be arranged in the interior of a composite glass pane. The metal-containing coating can, alternatively, the arranged on the outside of a single glass pane or a composite pane.

At least a first grid area and a second grid area are situated within the metal-containing coating and form, together, a communication window. In the context of the invention, the term "grid area" includes an area within the coating, which has, for example, linear de-coating by a laser. The linear de-coating forms a tile pattern with net meshes and is slightly brighter on the actual pane than the surrounding coating, in particular with grazing light incidence or in reflection.

The first grid area and the second grid area preferably have a rectangular basic shape with de-coated areas as described above in the form of grid lines arranged in a netlike manner. The distance between the individual grid lines is governed by the wavelength of the relevant electromagnetic radiation for which increased transmittance is desired.

The grid lines in the first grid area transition on at least one long side into an open comb structure. The term "comb structure" describes a grid area, in which on at least one side, the grid lines are not closed by surrounding grid lines and thus form a comb-like structure with teeth or prongs. At the same time, the grid lines in the second grid area transition on at least one long side into a closed comb structure, with the closed comb structure delimited toward the outside by a bordering grid line.

The first and the second grid area are arranged such that the first grid area is connected via at least one tooth of the open comb structure to the closed comb structure of the second grid area. This is accomplished in that at least one tooth of the open comb structure touches a grid line bordering the second grid area or overlaps it.

The result is that, by means of the connected grid areas, the electrical conductivity of the coating is interrupted and a contiguous electrically conductive area of the coating between the grid areas is no longer present. This creates an enlarged communication window made up of the first and second grid area, i.e., an enlarged area that is transparent to the electromagnetic radiation in the desired wavelength range.

The particular advantage of this arrangement according to the invention is that no visually disruptive widened lines or double lines can form in the connection region between the first grid area and the second grid area. Such double lines are known from the prior art in which two grid areas with a mutually closed comb structure overlap. Due to the positioning inaccuracy of the de-coating method, it is impossible, according to the prior art, to arrange the bordering grid line of the first grid area with the bordering grid line of the second grid area congruently one over the other.

In an advantageous embodiment of the invention, at least two teeth of the open comb structure are connected to the closed comb structure, since, thus, the area of the electrically conductive layer situated between the teeth is interrupted by the remaining surrounding electrically conductive layer. The two teeth are connected to the closed comb structure preferably in the respective outer areas of the open comb structure, and particularly preferably to the respective next to the last teeth. This ensures a reliable electrical isolation of the region situated between the teeth, even if there is a slight horizontal offset of the grid areas relative to each other. In another advantageous embodiment of the invention, substantially all teeth of the respective open comb structure are connected to the closed comb structure. This has the particular advantage that a reliable interruption of the electrically conductive layer occurs over a large area and the transition area between the grid areas has transmittance for electromagnetic radiation in the desired frequency range at a level similar to that of the grid areas. Here, "substantially all teeth" means that in the case of a horizontal offset of the grid areas relative to each other, one of the outer teeth does not have to or may be connected to the closed comb structure if it is arranged laterally next to the second grid area.

According to the invention, it suffices for the teeth of the open comb structure to touch the closed comb structure such that the metal-containing coating is electrically separated with adequately high impedance. However, the teeth can also extend over the closed comb structure by an overlap d and in particular with its bordering grid line.

In an advantageous embodiment of the invention, the overlap d is from 0 mm to 0.4 mm, preferably from 0 mm to 0.2 mm, and particularly preferably from 0 mm to 0.1 mm. Here, an overlap of d=0 means that one tooth touches the finitely extended bordering grid line of the other grid area, but does not protrude beyond it.

Such an overlap has the particular advantage that despite positioning inaccuracies of the laser system, a reliable de-coating of the metal-containing coating can be done in the connection region.

In an alternative advantageous embodiment of the invention, the overlap d is from 0% to 200% and preferably from 0% to 100% of the relative positioning accuracy $\Delta y$ of the laser system. The relative positioning accuracy $\Delta y$ is the positioning accuracy with which two grid areas can be arranged relative to each other and indicates the deviation relative to the nominal value. Here, an overlap of $d=0\%*\Delta y$ means that one tooth touches the finitely extended bordering grid line of the other grid area, but does not protrude beyond it. The relative positioning accuracy $\Delta y$ of the laser system is, for example, less than or equal to 200 μm, preferably less than or equal to 50 μm. Such an overlap has the particular advantage that, despite the positioning inaccuracies of the laser system, a reliable de-coating of the metal-containing coating can be done in the connection region.

In the coated pane according to the invention, the first grid area is connected via the open comb structure to the closed comb structure of the second grid area. The term "first grid area" describes any grid area within the communication window with at least one long side with an open comb structure. Here, "long side" means each side bounding the grid areas in the plane of the pane. It is understood that for the sequencing of more than two grid areas, one or a plurality of grid areas can also have open comb structures on multiple long sides. The term "second grid area" describes another grid area with at least one closed comb structure as a long side. (In the context of the invention, the terms "first" and "second" grid area accordingly describe any grid areas to which the above mentioned conditions apply.) By means of the connection according to the invention of at least two grid areas, double lines and non-de-coated regions are avoided. This reduces the perception of the connection between the individual grid areas otherwise deemed disturbing by the human eye. Non-stripped areas between the tiles can also weaken or even disrupt the transparency of the communication window to the desired electromagnetic radiation.

The grid lines preferably have a width from 40 μm to 200 μm, preferably 70 μm to 120 μm. The width is governed by the relevant electromagnetic radiation and the optical resolution of the laser scanner necessary for their production.

The grid lines preferably form squares and/or rectangles. In the case of bent panes, in particular with three dimensionally bent panes, the rectangular shapes can deviate from the right angle, and transition, for example, into a trapezoid or a parallelogram. Depending on the geometry of the pane, rounded or partially rounded communication windows are also possible.

The grid areas are advantageously implemented as rectangles, squares, or trapezoids. This has the particular advantage that a plurality of grid areas can, in a simple manner, be combined in a manner according to the invention to form a continuous communication window.

The grid lines preferably have a distance g between them from 0.2 mm to 15 mm, preferably 0.7 mm to 3 mm. The preferred distance between the grid lines enables adequate transparency for high-frequency electromagnetic radiation and in particular for radio or radar radiation.

In an advantageous embodiment of the invention, the two grid areas have an offset h from 0% to 50% of the distance g between grid lines. The offset h is preferably from 0% to 20% and particularly preferably from 0% to 10% of the distance g between grid lines. The offset h is defined orthogonal to the direction of the grid lines with the teeth. By means of such a small offset h, the grid lines of the first grid area are continued virtually congruently by the grid lines of the second grid area, and this yields a hardly perceptible negative visual impact.

In an advantageous embodiment of the invention, all teeth of the open comb structure have the same length a. The length a of the teeth is preferably from 50% to 150% of the sum of the distance g between the grid lines and the relative positioning accuracy $\Delta y$, particularly preferably from 80% to 120% of the sum of the distance g between the grid lines and the relative positioning accuracy $\Delta y$, and, in particular, from 95% to 105% of the sum of the distance g between the grid lines and the relativer positioning accuracy $\Delta y$. The smaller the deviation of the tooth length a from the distance g between the grid lines and the smaller the the overlap d of the teeth over the closed comb structure, the smoother the transition between the two grid areas and the more homogeneous and nondisruptive the visual aspect of the transition region between the first grid area and the second grid area.

In an alternative embodiment, at least one tooth and preferably two teeth have a length a from 50% to 150%, preferably from 80% to 120%, and particularly preferably from 95% to 105% of the sum of the distance g between the grid lines and the relative positioning accuracy $\Delta y$ of the laser system. The other teeth are implemented shorter and preferably have a length b from 50% to 150%, particularly preferably from 80% to 120%, and in particular from 95% to 105% of the distance g between the grid lines. In a particularly advantageous embodiment, at least all longer teeth of the length a of the open comb structure are connected to the closed comb structure. This has the particular advantage that the number of very short double lines of the length d is reduced to the number of teeth implemented longer, and, thus, the already improved optical throughvision is further improved. The longer teeth ensure the electrical interruption of the electrically conductive metal-containing layer, with the shorter teeth producing a uniform, homogeneous optical aspect with a virtually constant distance g between the grid lines in the transition region between the first grid area and the second grid area.

It is understood that, without restricting the invention, even in the case of the closed comb structure, the grid lines running orthogonal thereto can protrude slightly beyond the bordering grid line. This can, in particular, already result from the positioning accuracy of the laser scanner within a grid area. In an advantageous embodiment, the grid lines protrude from 0% to 10% of the distance g between the grid lines beyond the bounding grid area; preferably, the overlap is less than or equal to the positioning accuracy of the laser scanner within a grid area.

The metal-containing coating is preferably opaque to radio and/or radar radiation, in other words, to electromagnetic radiation in the radio frequency range such as FM, AM, UHF, VHF, DAB, mobile telephony, in the bands GSM 900, GSM 1800, and UMTS, satellite-assisted navigation (GPS), or microwave radiation. In the area of the communication window according to the invention, the metal-containing coating is transparent to the above-mentioned radiation, depending on the grid parameters, such as distance between grid lines and shape of the grid mesh.

The invention further comprises a motor vehicle pane and in particular a windshield or a rear window with the characteristics of the coated pane with a communication window according to the invention.

The invention further comprises a method for producing a coated pane with a communication window. In a first process step, a base pane, for example, a motor vehicle windshield with a metal-containing coating is provided. Optionally, additional dielectric and additional metal layers can also be applied. In the next step, the metal-containing coating is locally de-coated in the form of grid lines with a laser, and a first grid area with at least one long side with an open comb structure is obtained. Then, the metal-containing coating adjacent the first grid area is locally de-coated in the form of grid lines with a laser, and a second grid area with at least one long side with a closed grid is obtained. The arrangement of the second grid area is done such that the first grid area is connected via the open comb structure to the closed comb structure of the second grid area.

In an alternative embodiment, the second grid area can also be initially de-coated with a closed comb structure, and, then, the first grid area with an open comb structure can be connected to the second comb structure.

The connecting according to the invention of the grid areas via an open and a closed comb structure prevents or reduces the formation of visually disruptive double lines and, thus, inhomogeneities in the visual aspect.

The metal-containing coating is preferably de-coated with a laser. The laser enables a very precise and reproducible stripping of the metal-containing coating.

The laser is preferably guided at a speed from 100 mm/s to 10000 mm/s. The laser preferably has an output from 1 W to 10 kW and/or preferably includes a carbon dioxide laser, YAG laser, Nd-YAG laser, ytterbium-YAG laser, Holmium-YAG laser, erbium-YAG laser, -neodymium glass laser, -excimer laser, -fiber laser, -disk laser, -slab laser, or -diode laser.

The laser is preferably guided by a plotter. The plotter can further increase the size of the grid areas.

The invention further comprises the use of the coated pane according to the invention with a communication window as architectural, motor vehicle, ship, airplane, helicopter, or train glazing. The coated pane with a communication window according to the invention is preferably used as a motor vehicle windshield or rear window.

Another aspect of the invention relates to a coated pane with a communication window, comprising at least:
a. a base pane,
b. a metal-containing coating,
c. a first grid area and a second grid area within the metal-containing coating,
d. wherein the first grid area and the second grid area have a rectangular shape and have de-coated regions in the form of grid lines arranged in a netlike manner,
e. the grid lines in the first grid area transition on at least one long side into an open comb structure and the grid lines in the second grid area transition on at least one long side into a closed comb structure, wherein
f. the first grid area is connected via the open comb structure to the closed comb structure of the second grid area and the closed comb structure and the open comb structure terminate flush.

In the following, the invention is explained in detail with reference to drawings. The drawings are schematic representations and are not true to scale. They in no way restrict the invention.

They depict.

The dashing of the de-coated grid lines 40.2 is for illustrative purposes only; the grid lines 40.2 are, in practice, implemented continuous.

Figure 1:
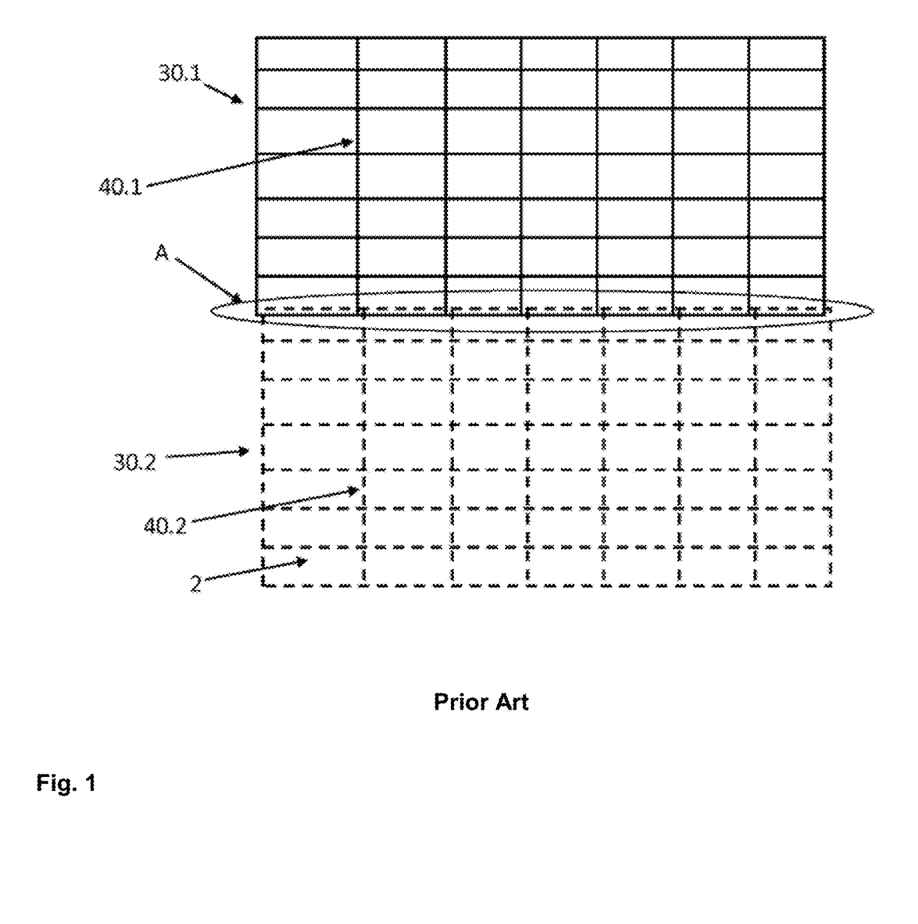
FIG. 1 a schematic view of an arrangement of two grid areas according to the prior art, FIG. 2 a schematic view of an arrangement of two grid areas according to the invention, FIG. 3 an enlarged schematic view of two grid areas connected according to the invention in accordance with FIG. 2, FIG. 4A a schematic view of a grid area with an open comb structure, FIG. 4B a schematic view of a grid area with a closed comb structure, FIG. 5 an enlarged schematic view of an alternative embodiment of two grid areas connected according to the invention, FIG. 6A a schematic view of an alternative grid area with an open comb structure, FIG. 6B a schematic view of an alternative grid area with a closed comb structure, FIG. 7 a schematic view of a communication window with four grid areas connected according to the invention, FIG. 8 a schematic view of the coated pane with a communication window, and FIG. 9 a flowchart of the method for producing a coated pane with a communication window.

FIG. 1 depicts a schematic view of an arrangement of two grid areas 30.1, 30.2 according to the prior art. The upper grid area 30.1 is formed by de-coated grid lines 40.2 on a metal-containing coating 2. The lower grid area 30.2 is likewise formed by de-coated grid lines 40.2 on the metal-containing coating 2. In the connection region A between the upper grid area 30.1 and the lower grid area 30.2, there is an overlapping of the grid lines 40.1, 40.2. The ellipse A is for illustrative purposes only and is not part of the communication window. In particular, the two grid lines 40.1 and 40.2 running horizontally, arranged directly adjacent each other have only a small distance between them, which results in line widening or doubling of the grid lines 40.1, 40.2 in connection region A. Such an arrangement of two grid lines 40.1, 40.2 is perceived, as visual inhomogeneity in the connection region A as very disruptive and hindering through-vision. Such a communication window would be only poorly suited for use on a windshield of a motor vehicle.

Figure 2:
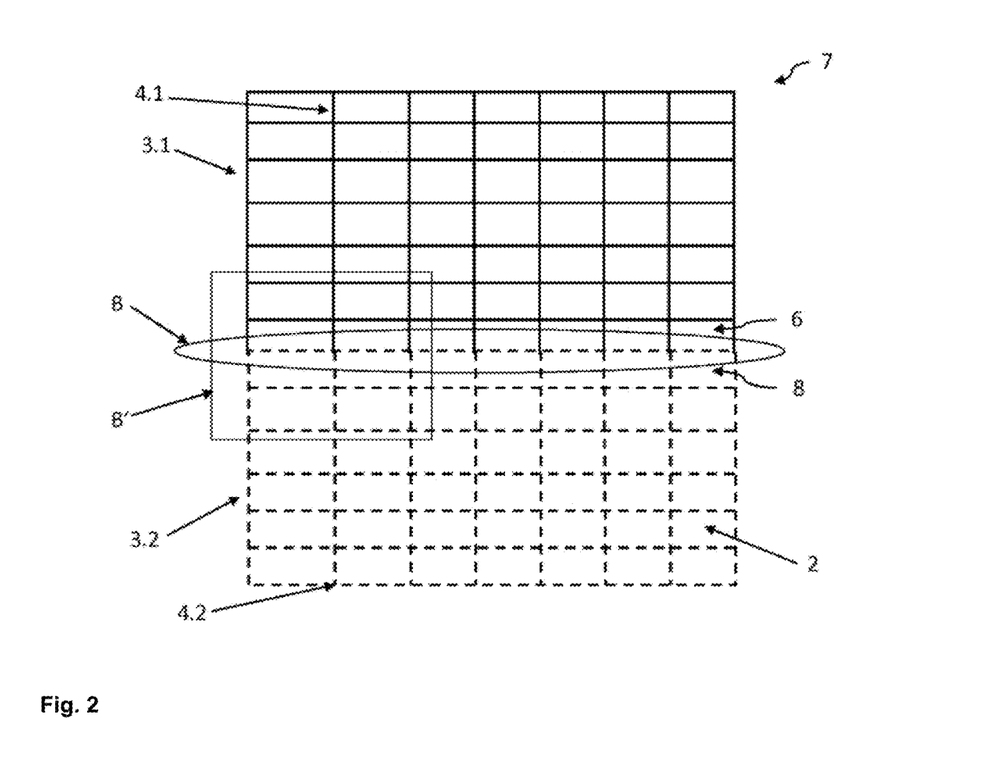
Figure 3:
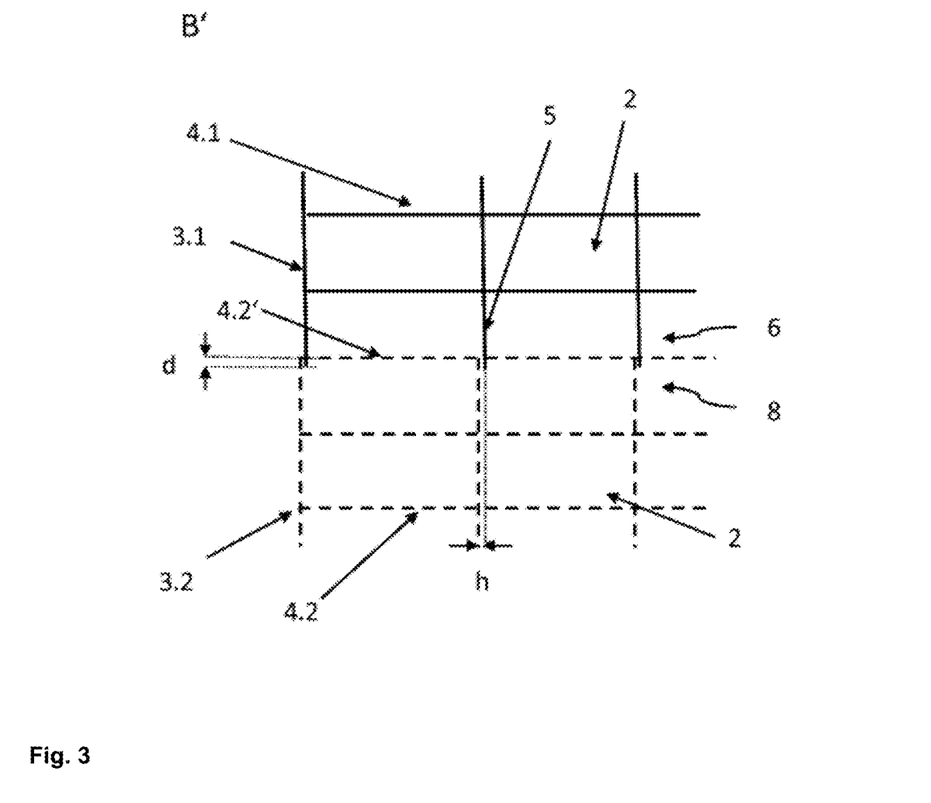
Figure 4A:
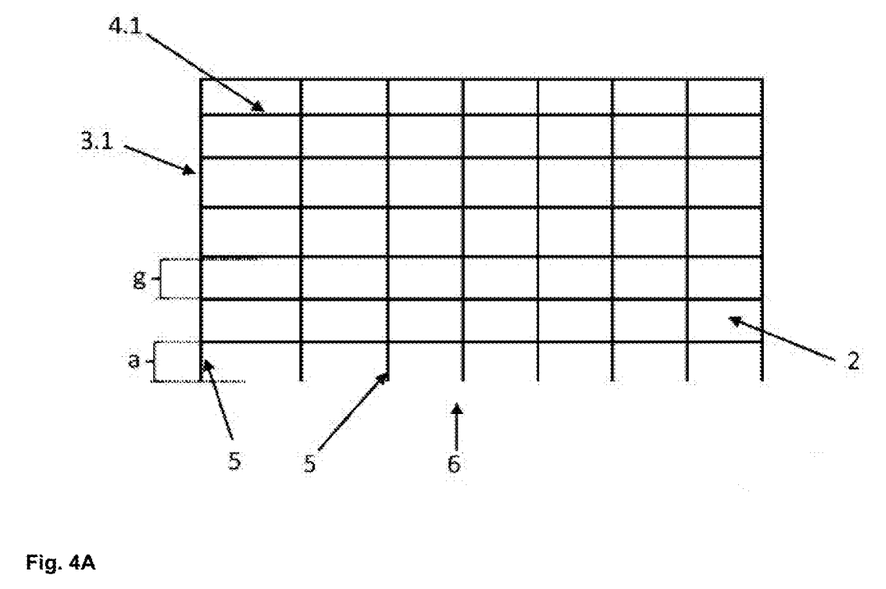

FIG. 2 depicts a schematic view of an arrangement according to the invention of two grid areas 3.1, 3.2 which, together, form a communication window 7. FIG. 3 depicts an enlarged detail of the connection region B' of FIG. 2. FIG. 4A depicts a single representation of the first grid area 3.1 with an open comb structure 6 and FIG. 4B a single representation of the second grid area 3.2 with a closed comb structure 8.

As can be discerned in detail in FIG. 4A, the first grid area 3.1 has a plurality of horizontally and vertically arranged de-coated grid lines 4.1 that form a net structure with, for example, rectangular meshes. The grid lines 4.1 are, for example, produced by de-coating a metal coating 2 using a laser scanner.

The first grid area 3.1 has, on one long side, an open comb structure 6, which is formed from individual teeth 5. The teeth 5 are preferably a continuation of the grid lines 4.1, arranged vertically in this example. The distance g between the grid lines is, in this example, 2 mm, the length a of the teeth is, for example, likewise roughly 2.1 mm, which corresponds, for example, to the sum of the distant g between the grid lines of 2 mm and a relative positioning accuracy Δy of 0.1 mm.

Figure 4B:
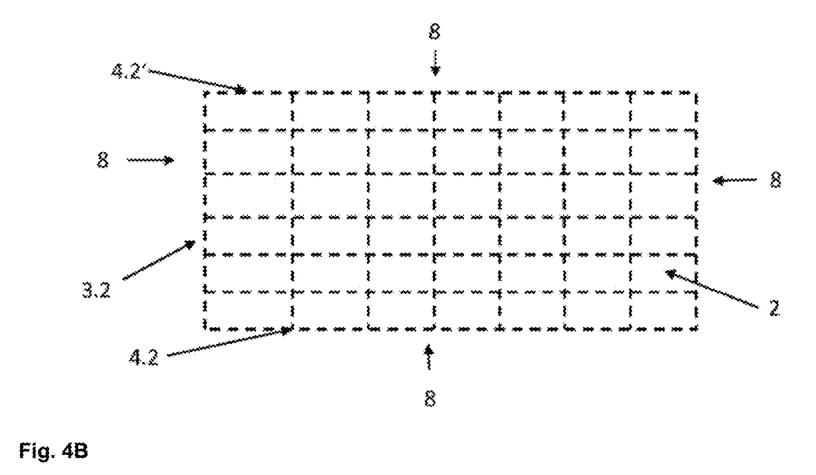

As can be discerned in detail in FIG. 4B, the second grid area 3.2 has a plurality of de-coated grid lines 4.2 arranged horizontally and vertically, which form a net structure with, for example, rectangular meshes. Advantageously, the second grid area 3.2 has the same mesh size as the first grid area 3.1. The distance g between the grid lines is accordingly also 2 mm. Moreover, the grid lines 4.2 are produced in a manner analogous to the grid lines 4.1, for example, by de-coating the metal coating 2 using a laser scanner.

The second grid area 3.2 has, in this example, a closed comb structure 8 on all long sides. Here, the term "closed comb structure 8" means that the grid area 3.2 has, on the respective outer boundary, a bounding or bordering grid line 4.2' and no grid lines 4.2 running orthogonal thereto protrude beyond the bordering grid line 4.2'.

FIG. 2 depicts an arrangement according to the invention of the first grid area 3.1 and of the second grid area 3.2. The first grid area 3.1 is connected via the teeth 5 of the open comb structure to the bordering grid line 4.2' of the closed comb structure 8 of the second grid area 3.2.

FIG. 3 depicts an enlarged schematic view of the connection region B' of two grid areas 3.1 and 3.2 connected according to the invention in accordance with FIG. 2. The teeth 5 of the open comb structure 6 of the first grid area 3.1 overlap the bordering grid line 4.2' of the second grid area by an overlap d from 0 to 0.4 mm and, for example, by 0.1 mm. By means of the connection according to the invention of an open comb structure 6 and a closed comb structure 8, the formation of a visually disruptive double line is reliably avoided, as is known according to the prior art in FIG. 1.

The first grid area 3.1 and the second grid area 3.2 are offset relative to each other in the horizontal direction by a distance h. The offset h is advantageously less than or equal to 10% of the distance g between the grid lines and is, for example, 0.1 mm. Since the vertically arranged grid lines 4.1 and 4.2 overlap only in a very small range of the length d, the user of the pane can discern no disruptive double line or line widening in this direction either.

Figure 5:
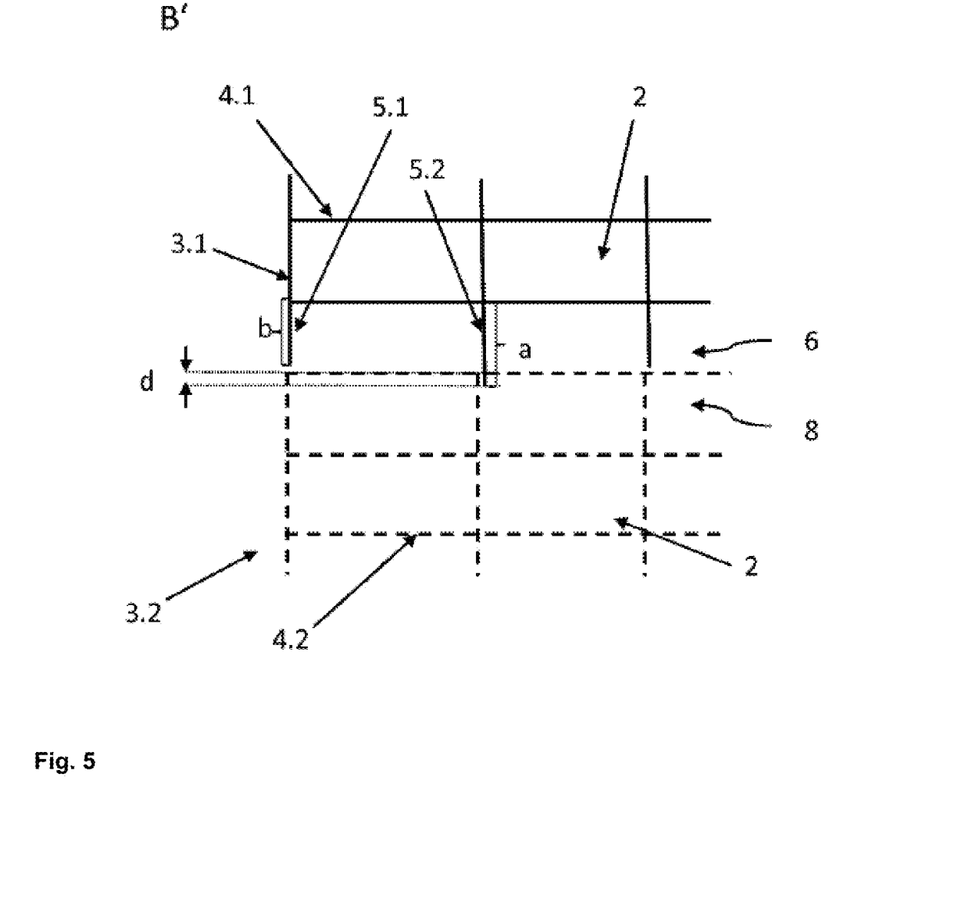
Figure 6A:
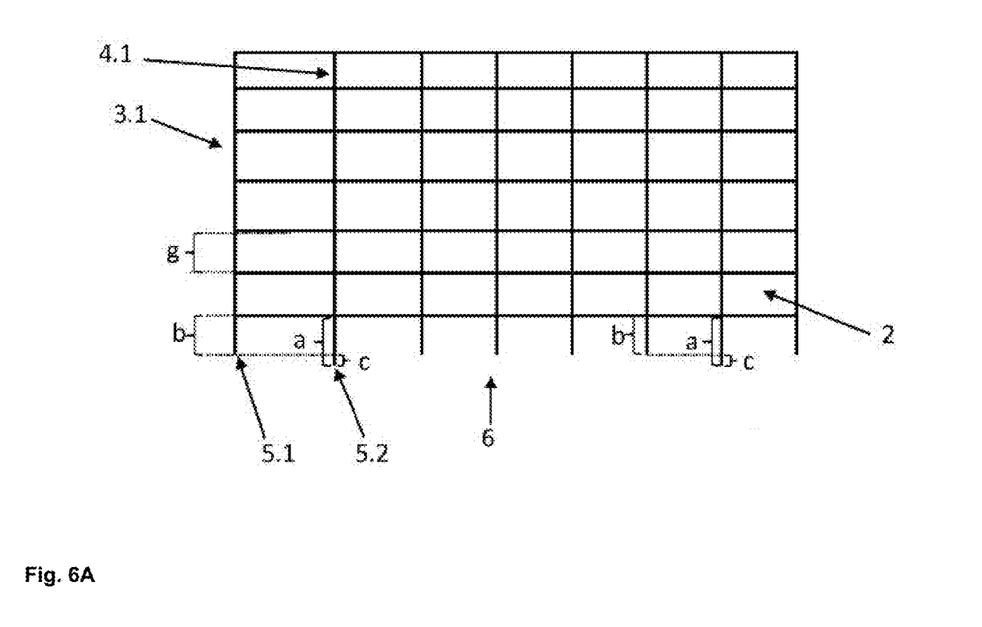

FIG. 5 depicts an enlarged schematic view of an alternative embodiment of two grid areas 3.1 and 3.2 connected according to the invention. FIG. 6A depicts a detailed isolated representation of the first grid area 3.1 with an open comb structure 6. The first grid area 3.1 of FIG. 6A differs from the first grid area 3.1 of FIG. 4A only through the length of the teeth 5.1,5.2 and is otherwise configured in the same manner. In the first grid area 3.1 of FIG. 6A, for example, two teeth 5.2 have a length a and are thus longer by a length c than the teeth 5.1 with the length b. The length b is, for example, 2 mm; the length a is, for example, 2.1 mm such that the longer teeth 5.2 are configured longer by 5% and, for example, longer by a relative positioning accuracy Δy of 0.1 mm than the shorter teeth 5.1. Here, the longer teeth 5.2 with length a are arranged on the respective next-to-the-last teeth of the open comb structure. This has the advantage that even with a small offset h, which results from the relative positioning accuracy in the horizontal direction here, both longer teeth 5.2 can be connected to the closed comb structure 8, whereas one of the outermost teeth runs laterally next to the closed comb structure 8.

Figure 6B:
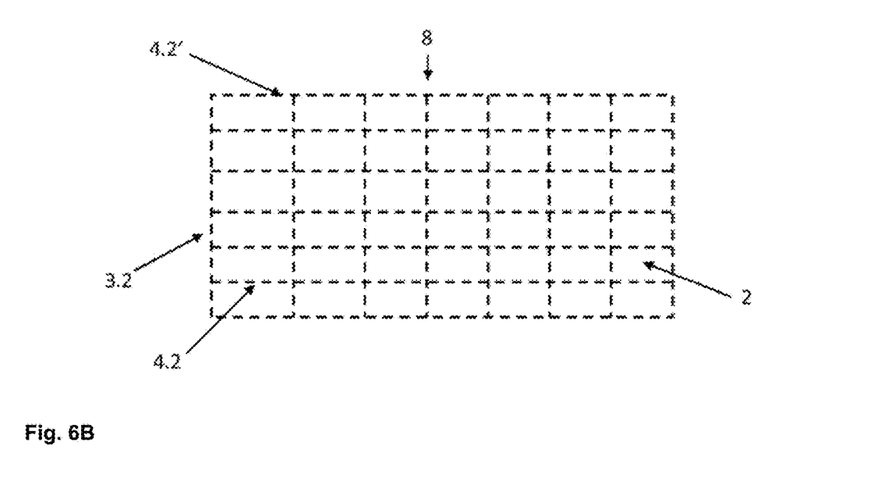

FIG. 6B depicts a detailed representation of the second grid area 3.2 with a closed comb structure 8, wherein the second grid area 3.2 corresponds to the grid area 3.2 of FIG. 4B.

As can be discerned in FIG. 5, only the teeth 5.2 with the length a are connected to the second grid structure 3.2 and have an overlap d of, for example, 0.05 mm.

In the arrangement of FIG. 5, a small double line with the length of the overlap d can be discerned only in the region of the overlap d of the teeth 5.2 with the length a. In the region of the teeth 5.1 with the length b, a small gap can occur that is hardly perceptible visually. Ideally, the teeth 5.1 with the length b contact even the bounding grid line 4.2' of the closed comb structure 8 of the second grid. By means of this embodiment of the invention, even less disruption of the through-vision can be obtained than with the embodiment without improvement according to FIG. 3.

Figure 7:
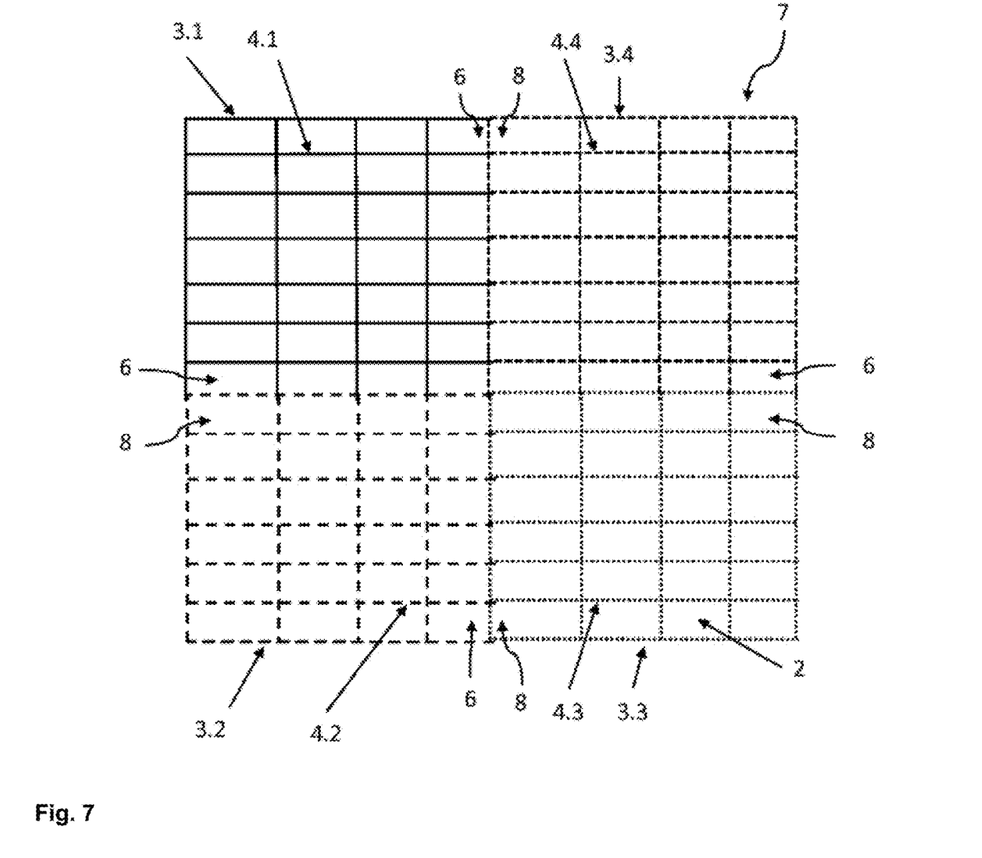

FIG. 7 depicts a schematic view of a communication window 7 with, for example, four grid areas 3.1,3.2,3.3,3.4 connected according to the invention. In order to obtain larger communications windows 7, any number of grid areas can be connected to each other according to the principle of the invention. In each case, the open comb structure 6 of one grid area is connected via its teeth to the closed comb structure 8 of an adjacent grid area.

In the example depicted, the first grid area 3.1 has an open comb structure 6 on its lower long side. The open comb structure 6 on the lower side is connected to the closed comb structure 8 of a second grid area 3.2. A third grid area 3.3 is arranged adjacent the second grid area 3.2. The second grid area 3.2 is connected via another open comb structure 6 to the closed comb structure 8 of the third grid area 3.3. The third grid area 3.3 is connected via a closed comb structure 8 on its upper long side to an open comb structure 6 of a fourth grid area 3.4. The fourth grid area 3.4 is, in turn, connected via a closed comb structure 8 to an open comb structure 6 of the first grid area 3.1. It is understood that any number of grid areas, even with an offset or different shapes and sizes can be thus sequenced with each other, with, in each case, two grid areas connected to each other via an open comb structure. In this manner, the size and the properties of the communication window can be flexibly adapted to the respective circumstances.

Figure 8:
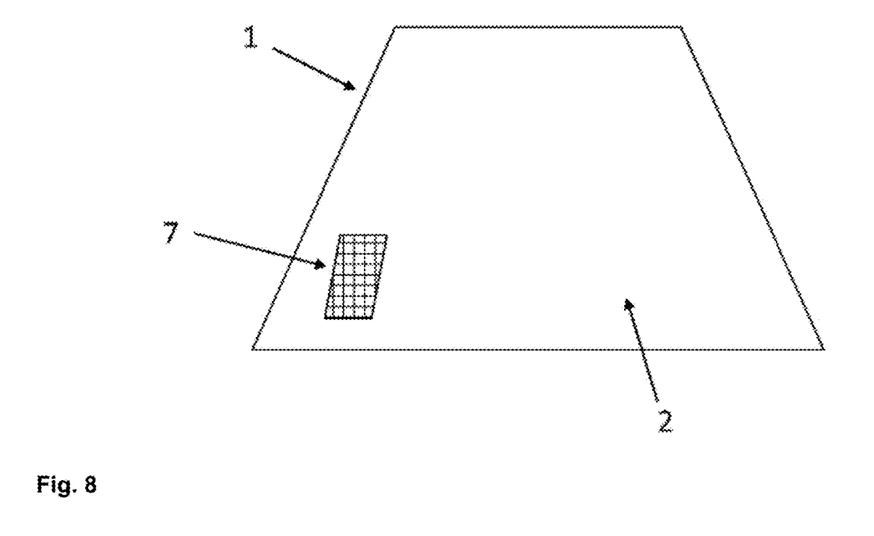

FIG. 8 depicts a schematic view of the coated pane with a communication window 7. A metal-containing coating 2 is situated on the base pane 1, for example, a motor vehicle windshield. In contrast to the metal-containing coating, the partially de-coated communication window 7 is transparent to high-frequency electromagnetic radiation, for example, in the radiofrequency range and the microwave range. The metal-containing coating 2 can be arranged in the interior of a composite pane. Alternatively, the metal-containing coating 2 can be arranged on one of the outer sides of a single glass pane or of a composite glass pane. The transparency of the pane to infrared radiation is significantly reduced by the metal-containing coating 2. This is only insubstantially affected by the partially de-coated communication window 7.

Figure 9:
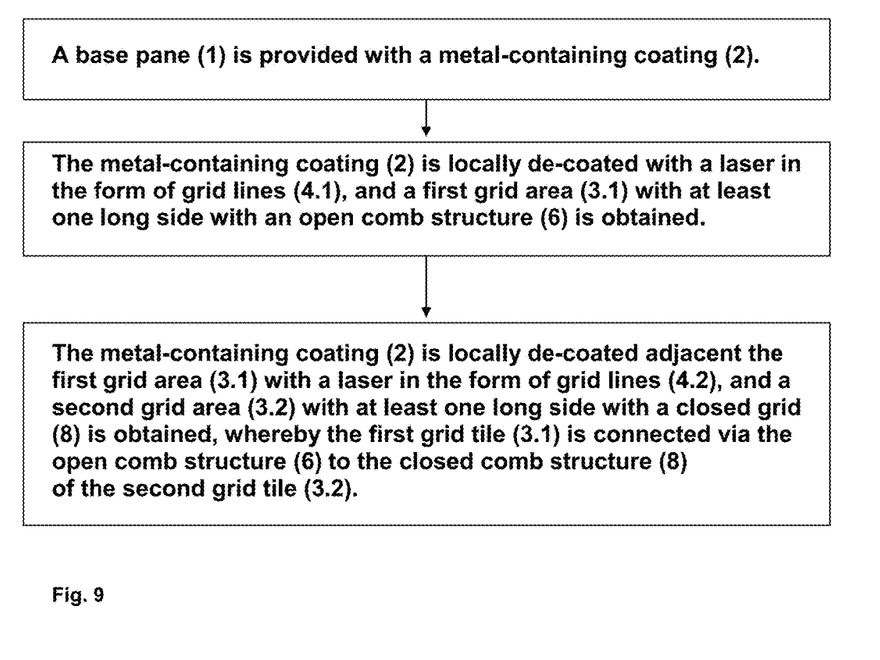

FIG. 9 depicts a flowchart of an exemplary embodiment of the method according to the invention for producing a coated pane with a communication window 7. In a first process step, a base pane 1 is provided with a metal-containing coating 2. In the next step, the metal-containing coating 2 is locally de-coated with a laser in the form of grid lines 4.1, and a first grid area 3.1 with at least one long side with an open comb structure 6 is obtained. Then, the metal-containing coating 2 is locally de-coated adjacent the first grid area 3.1, also with a laser, in the form of grid lines 4.2, and a second grid area 3.2 with least one long side with a closed comb structure 8 is obtained. The second grid area 3.2 is arranged such that the first grid area 3.1 is connected via the teeth 5 of the open comb structure 6 to the closed comb structure 8 of the second grid area 3.2.

LIST OF REFERENCE CHARACTERS 1 base pane
2 metal-containing coating
3.1 first grid area
3.2 second grid area
4.1 grid lines of the first grid area 3.1
4.2 grid lines of the second grid area 3.2
4.2' bounding or bordering grid line of the closed comb structure 8
5, 5.1,5.2 tooth
6 open comb structure
7 communication window/arrangement of the grid areas 3.1, 3.2 according to the invention
8 closed comb structure
30.1, 30.2 grid area according to the prior art
40.1, 40.2 grid lines according to the prior art
a length of the tooth 5 and 5.2
b length of the tooth 5.1
c length
d overlap
g distance between grid lines
Δy relative positioning accuracy of the laser system
A connection region between the grid area 3.2 and the grid area 3.2' according to the prior art
B connection region between the first grid area 3.1 and of the second grid area 3.2 according to the invention
B' detail

The invention claimed is:

1. A method for producing a coated pane with a communication window, comprising:
   in a first step, providing a base pane with a metal-containing coating; and
   in a second step,
   i) locally decoating, in a first pane region, the metal-containing coating with a laser to form a plurality of separate and parallel horizontal decoated lines and a plurality of separate and parallel vertical decoated lines that intersect to form a first grid area having a net structure, the first grid area further having at least one long side with an open comb structure with teeth arranged at a first edge region of the first grid area, the teeth being formed by extensions of the plurality of the separate and parallel vertical decoated lines beyond a last decoated line of the plurality of separate and parallel horizontal decoated lines, and ii) locally decoating, in a second pane region, the metal-containing coating adjacent the first grid area with a laser to form a plurality of separate and parallel horizontal decoated lines and a plurality of separate and parallel vertical decoated lines that intersect to form a second grid area having a net structure, the second grid area further having at least one long side with a closed comb structure arranged at a second edge region of the second grid area, the closed comb structure being formed by a first decoated line of the plurality of separate and parallel horizontal decoated lines that coincides with ends of the plurality of separate and parallel vertical decoated lines at the second edge region, wherein the first pane region and the second pane region overlap only at the first and second edge regions so that the first grid area and the second grid area are connected via connection of at least one tooth of the open comb structure to the first decoated line of the closed comb structure, and wherein step i) is executed before step ii).

2. The method according to claim 1, wherein the laser is guided at a speed from 100 mm/s to 10000 mm/s.

3. The method according to claim 1, wherein the laser comprises a carbon dioxide laser, YAG laser, Nd YAG laser, ytterbium YAG laser, holmium YAG laser, erbium YAG laser, neodymium glass laser, excimer laser, fiber laser, disk laser, slab laser, or diode laser, and the laser has output from 1 W to 10 kW.

4. A method for producing a coated pane with a communication window, the method comprising:

in a first step, providing a base pane with a metal-containing coating; and in a second step, i) locally decoating, in a second pane region, the metal-containing coating with a laser to form a plurality of separate and parallel horizontal decoated lines and a plurality of separate and parallel vertical decoated lines that intersect to form a second grid area having a net structure, the second grid area further having at least one long side with a closed comb structure arranged at a second edge region of the second grid area, the closed comb structure being formed by a first decoated line of the plurality of separate and parallel horizontal decoated lines that coincides with ends of the plurality of separate and parallel vertical decoated lines at the second edge region, and ii) locally decoating, in a first pane region, the metal-containing coating adjacent the second grid area with a laser to form a plurality of separate and parallel horizontal decoated lines and a plurality of separate and parallel vertical decoated lines that intersect to form a first grid area having a net structure, the first grid area further having at least one long side with an open comb structure with teeth arranged at a first edge region of the first grid area, the teeth being formed by extensions of the plurality of the separate and parallel vertical decoated lines beyond a last decoated line of the plurality of separate and parallel horizontal decoated lines, wherein the first pane region and the second pane region overlap only at the first and second edge regions so that the first grid area and the second grid area are connected via connection of at least one tooth of the open comb structure to the first decoated line of the closed comb structure, and wherein step i) is executed before step ii).

5. The method according to claim 4, wherein the laser is guided at a speed from 100 mm/s to 10000 mm/s.

6. The method according to claim 4, wherein the laser comprises a carbon dioxide laser, YAG laser, Nd YAG laser, ytterbium YAG laser, holmium YAG laser, erbium YAG laser, neodymium glass laser, excimer laser, fiber laser, disk laser, slab laser, or diode laser, and the laser has output from 1 W to 10 kW.

7. The method according to claim 1, wherein:

a distance g between any two consecutive decoated lines of the plurality of separate and parallel vertical decoated lines of the first and second grid areas is constant, and the connection between the first and second grid areas provides an offset in alignment between the plurality of separate and parallel vertical decoated lines of the first and the second grid areas that is in a range from 0% to 10% of the distance g.

8. The method according to claim 4, wherein:

a distance g between any two consecutive decoated lines of the plurality of separate and parallel vertical decoated lines of the first and second grid areas is constant, and the connection between the first and second grid areas provides an offset in alignment between the plurality of separate and parallel vertical decoated lines of the first and the second grid areas that is in a range from 0% to 10% of the di stance g.

* * * * *